United States Patent

Vincenty

[15] 3,695,708

[45] Oct. 3, 1972

[54] EXHAUST SYSTEM FOR A LOAD DUMPING VEHICLE

[72] Inventor: Henry E. Vincenty, Willoughby Hills, Ohio

[73] Assignee: Euclid, Inc., Cleveland, Ohio

[22] Filed: Aug. 13, 1970

[21] Appl. No.: 63,444

[52] U.S. Cl. ..............................................298/1 H
[51] Int. Cl. ............................................F02b 75/10
[58] Field of Search.....................................298/1 H

[56] References Cited

UNITED STATES PATENTS 3,290,093   12/1966   Eaton .......................298/1 H
2,721,097   10/1955   Rittenhouse...............298/1 H

FOREIGN PATENTS OR APPLICATIONS 798,255   1/1956   Great Britain.............298/1 H

*Primary Examiner*—Benjamin Hersh
*Assistant Examiner*—Robert R. Song
*Attorney*—Watts, Hoffmann, Fisher & Heinke

[57] ABSTRACT

A load dumping vehicle including a frame, a gas turbine engine supported by the frame and a dump body pivotally connected to the frame for movement relative to the frame between a load carrying position and a dump position. Exhaust from the engine is ducted under the dump body through first and second exhaust ducts. Part of the exhaust flows into the dump body to heat the load. The ducts are connected at adjacent ends by a coupling structure which seals the juncture of the exhaust ducts when the dump body is in its load carrying and in its dump positions.

15 Claims, 6 Drawing Figures

PATENTED OCT 3 1972 3,695,708

INVENTOR.
HENRY E. VINCENTY

BY Watts, Hoffmann
Fisher & Heinke
ATTORNEYS.

INVENTOR.
HENRY E. VINCENTY
BY Watts, Hoffmann,
Fisher & Heinke
ATTORNEYS.

EXHAUST SYSTEM FOR A LOAD DUMPING VEHICLE

BACKGROUND OF THE INVENTION

1. Field of the Invention

The present invention relates to a load dumping vehicle and more particularly relates to a load dumping vehicle having an exhaust system constructed to continuously heat the dump body regardless of the position of the dump body.

2. The Prior Art

Load dumping vehicles, such as dump trucks, which are powered by internal combustion engines have been constructed so that when a dump body of the vehicle is operated between its load carrying and dump positions an exhaust system associated with an engine of the vehicle was articulated. In such arrangements, at least a portion of the engine exhaust system moved as the dump body moved.

At one time a problem with dump vehicles was that the payload would freeze in the dump body during cold weather conditions. To overcome this, heated dump bodies were developed. These dump bodies were heated by ducting exhaust gases from the vehicle engine through passages formed in the body. The exhaust gases heated the body sufficiently to prevent the load from freezing and adhering to the body.

In one type of prior construction, the exhaust gas entered the dump body via a vertical stack which extended into an opening in the dump body adjacent the operator's cab. When a load was dumped, the dump body raised up and was disconnected from the exhaust stack. The exhaust gases were then expelled from the stack into the atmosphere in the vicinity of the vehicle cab. Thus, the operator of the truck was frequently exposed to the exhaust gases. Because those gases could be both irritating and dangerous, this type of construction for heating the dump bodies was not entirely desirable.

Vehicles have been constructed which overcame the problem of excessive operator exposure to the exhaust gases. One successful system employed an auxiliary exhaust pipe which extended rearwardly of the vehicle. When the vehicle body was down, a valve shut off the auxiliary exhaust pipe and directed the exhaust gases into the body. When the body was up, i.e., in its dumping position, the main stack was shut off and gases were diverted through the auxiliary exhaust pipe.

Another proposal was to continuously heat the dump by means of a permanent connection between the dump body ducting and the engine exhaust system. In this proposal, the engine exhaust system included a rotatable joint between one exhaust pipe connected to the engine and another exhaust pipe connected to the dump body. This rotatable joint was intended to be aligned and coaxial with the axis of rotation of the dump body on the vehicle frame. When the dump body was raised and lowered, the joint would swivel about its axis enabling a continuous flow of exhaust gas through the joint to the dump body.

Positioning a swivel joint in an exhaust system coaxially with the pivot axis of a dump body was difficult, and maintaining the joint properly positioned was even more difficult. Accordingly this proposal was not totally satisfactory.

Another disadvantage of this continuously heated system was that the entire exhaust flow from the engine was directed into the dump body to heat the body at all times. Therefore when warm or dry loads were being transported, the dump body was heated even though heating was not necessary. Furthermore, ducting exhaust gases into the dump body at all times caused constant relatively large back pressures on the vehicle engine which reduced its performance unnecessarily particularly when maximum heating of the dump body was not required.

SUMMARY OF THE INVENTION

The present invention provides a new exhaust system for continuously heating the body of a load dumping vehicle and which is: simple in construction; usable as an exhaust system for any type of internal combustion engine including a gas turbine engine; effective to seal against escape of exhaust gas between a fixed duct and a movable duct; and, not installed on the pivot axis of the dump body.

In a preferred embodiment of the invention, the load dumping vehicle is a dump truck powered by a gas turbine engine. The dump body is movable about the axis of a pivot construction between a load carrying position and a dump position. The exhaust of the vehicle and a second duct attached to the movable dump body. The second duct moves with the dump body relative to the first duct.

The second duct includes one branch for directing the engine exhaust directly to atmosphere and another branch for directing the exhaust gases to atmosphere through passageways formed in the dump body. The dump body is thus continuously heated by the engine exhaust regardless of the position of the dump body relative to the vehicle frame.

A duct coupling structure is connected between adjacent ends of the first and second ducts in the vicinity of a pivot construction about which the dump body moves. This coupling includes a coupling member defining an exhaust flow passage which extends generally transverse to the direction of the pivot axis.

The duct which is fixed to the frame extends freely into the coupling member. The coupling member is connected to the dump body so that as the dump body rotates between its load carrying and dump positions, the coupling member moves with the dump body relative to the fixed duct.

The coupling member cooperates with the fixed duct to provide a seal against the escape of exhaust gas from within the fixed duct when the dump body is in either of its noted positions. When the dump body is in its load carrying position, the fixed duct extends into the coupling member on an angle with respect to the plane of the opening in the coupling member. The angle between the duct and the opening in the coupling member is such that the opening in the coupling member is foreshortened and thus closely surrounds the periphery of the duct.

The fixed duct supports a first peripheral sealing flange which is inclined with respect to the duct. The sealing flange engages a second sealing flange disposed about the opening of the coupling member. These flanges are coplanar when the dump body is in the load carrying position and are engaged to tightly seal about the fixed duct and the opening in the coupling member.

When the dump body is in its dumping position, the coupling member is moved to a location at which the fixed duct extends into the opening in the coupling member at a second angle. This angle is such that the duct opening is foreshortened to closely surround the periphery of the end of the fixed duct. In this position, a third sealing flange on the duct engages the second sealing flange on the coupling member to seal against the escape of exhaust gas between the fixed duct and the coupling member.

When the dump body is moving its load carrying and load dumping positions, the faces of the sealing flanges on the duct and coupling member are disengaged. Some leakage of exhaust can thus occur. However, this leakage is minimal and does not occur over any appreciable period of time since the dump body is not maintained in a position intermediate the load carrying and dump positions. Furthermore, the coupling is remote from the operator's cab so that even if exhaust leaks from the coupling the operator is not exposed to it.

The exhaust ducts are preferably rectangular in cross sectional shape and the coupling structure includes a tubular coupling member which is also of generally rectangular cross sectional shape. The coupling member has a larger cross sectional area than the ducts. The rectangular opening in the coupling member is just slightly wider than the fixed duct but is of substantially greater height. This additional height permits the fixed duct to extend into the coupling opening at the aforementioned angles for sealing yet enables relative movement between the duct and coupling member without interference.

The preferred coupling member is spaced from the pivot axis of the dump body. Hence, the coupling member orbits about the pivot axis when the dump body moves. Because of this construction, an exhaust system constructed according to the invention is installable on any dump truck without requiring any particular dump body or frame construction to accommodate the coupling and associated ducts.

The new exhaust system also incorporates an exhaust deflecting vane for controlling the amount of exhaust gas which flows into the dump body to heat. This enables the degree of heating of the dump body to be controlled without unduly increasing exhaust back pressures at the engine.

A principal object of the present invention is the provision of a new and improved exhaust system for continuously heating the body of a load dumping vehicle in which exhaust ducts and their couplings are articulated as the dump body is moved between its load carrying and its dumping position and with the coupling being of simple construction yet sufficiently rugged to operate over long periods of use.

Other objects and advantages of the invention will become apparent from the following detailed description thereof made with reference to the accompanying drawings which form a part of the specification.

DESCRIPTION OF A PREFERRED EMBODIMENT

Figure 1:
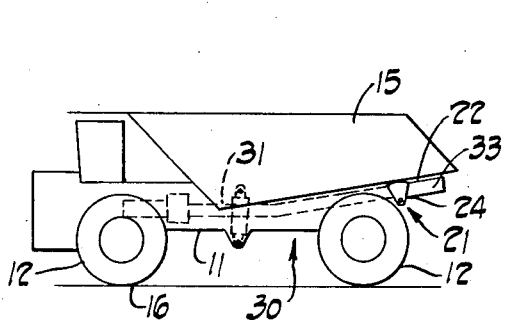
FIG. 1 is a schematic side elevational view of the load dumping vehicle embodying the present invention.
Figure 2:
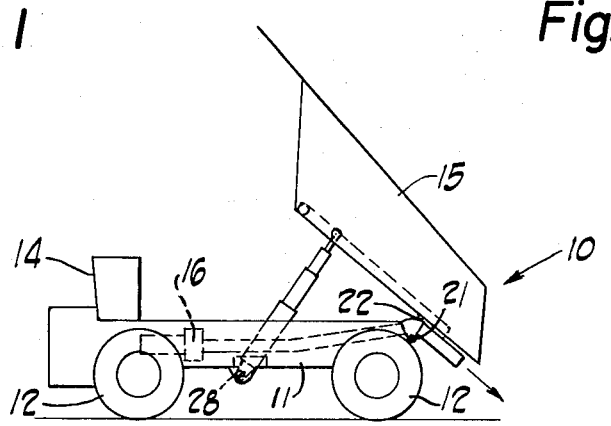
FIG. 2 is a view similar to FIG. 1 showing a dump body of the vehicle in a load dumping position.

A dumpable vehicle 10 in the form of an off-the-road dump truck is illustrated in FIGS. 1 and 2. The truck 10 includes a frame 11 which is supported by ground engaging the driving wheels 12. The frame 11 supports an operator's cab 14, a dump body 15 and a gas turbine engine 16.

The dump body 15 is formed by a floor plate assembly 17, side liner plates 18 and a front plate 19. The floor plate assembly includes a floor plate 17a and structural support members 17b, 17c, 17d, 17e. The members 17b–17d extend along part of the perimeter of the floor plate proper. The support members 17b, 17d extend along the junctures of the floor plate 17a and the side plates 18 while the member 17c extends along the juncture of the front plate 19 and the floor plate. The structural member 17e extends between the members 17b, 17d near the rearward end of the floor plate.

The members 17b–17e define a passageway 20 about the junctures of the floor plate and with the side and front plates. This passageway conducts exhaust gas from the engine 16 to the atmosphere in the direction shown by the arrows in FIG. 3. The exhaust gas heats the dump body as it flows through the structural members, and is subsequently directed into the atmosphere at the rear of the body via an opening at the rearward end of the support member 17d.

The dump body 15 is pivotally connected to the frame 11 for movement between a load carrying position, illustrated in FIG. 1, and a load dumping position illustrated in FIG. 2. A pivot construction 21 connects the dump body to the frame and includes support arms 22 which extend from the dump body to trunions 24 which project from the frames. The trunions 24 support the arms 22 for rotation about a pivot axis 26 extending transversely to the frame 11.

The gas turbine engine 16 provides a source of driving power for the truck 10 via an electric generator, not shown, which is driven from the output shaft of the engine. The generator produces electrical power for operating electric motors associated with each of the vehicle wheels. The generator may also provide the motive power for operating a hydraulic system which actuates various components on the vehicle. The hydraulic system includes actuators 28 for moving the dump body between its load carrying and dumping positions.

An exhaust system 30 directs exhaust from the engine 16 along the frame 11. The exhaust system 30 expells the exhaust gas at the rear of the dump body and also directs a part of the exhaust into the passageway 20 for heating the dump body.

The system 30 preferably extends along the longitudinal centerline of the truck and includes a first exhaust duct 31 which is fixed relative to the frame 11, a second exhaust duct 33 fixed to the dump body 15, and a duct coupling structure 34 enabling the duct 33 to move relative to the duct 31 as the dump body moves. The coupling 34 seals the exhaust system against the escape of exhaust gas when the dump body is in its load carrying position and in its dumping position.

Figure 3:
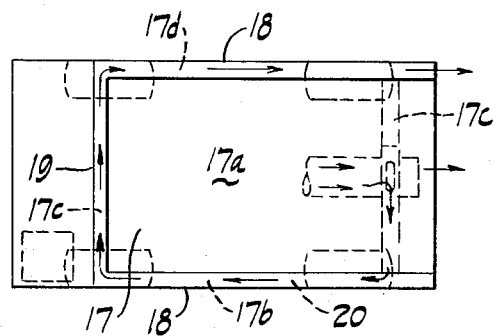
FIG. 3 is a top plan view of the vehicle shown in FIG. 1.
Figure 4:
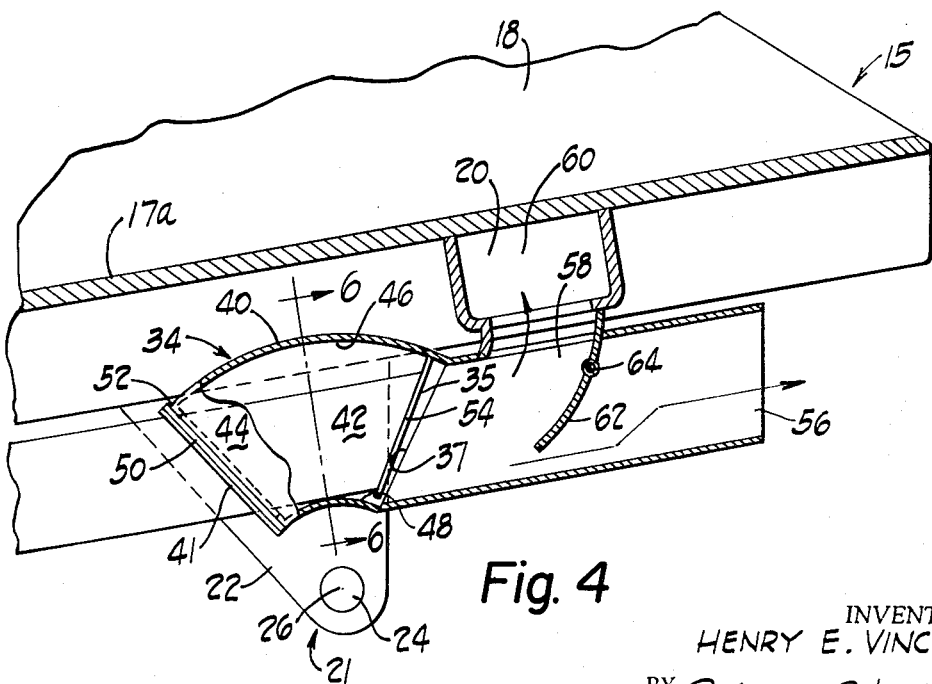
FIG. 4 is a fragmentary cross sectional view of a portion of the vehicle illustrated in FIG. 1.
Figure 5:
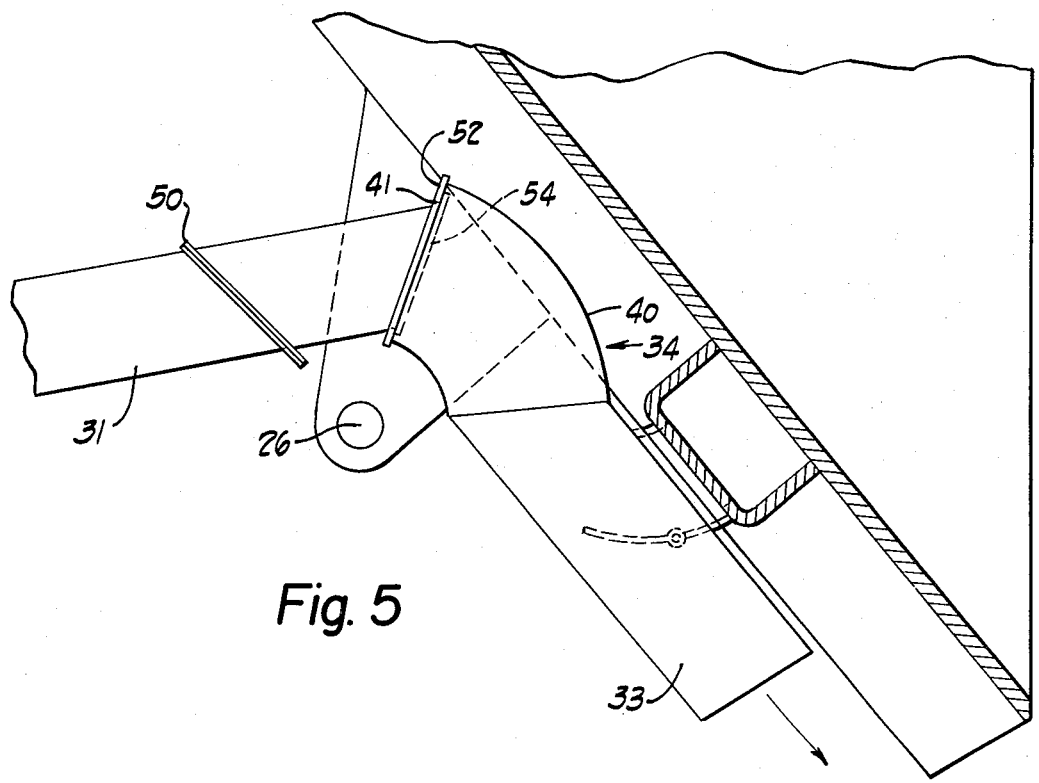
FIG. 5 is a fragmentary cross sectional view of a portion of the vehicle illustrated in FIG. 2; and, FIG. 6 is a cross sectional view as seen from the plane indicated by the line 6—6 of FIG. 4.
Figure 6:
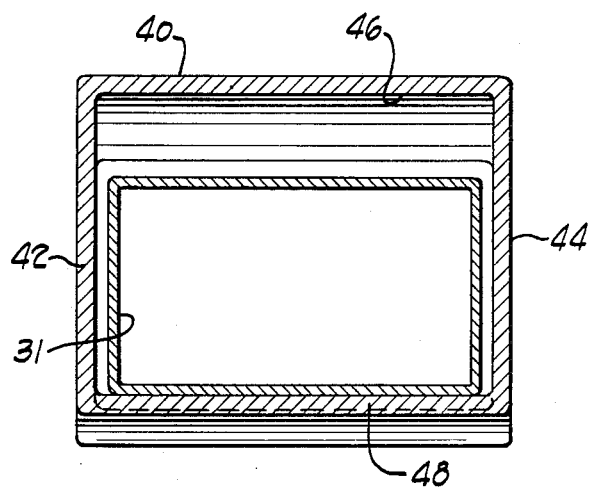

As is best seen in FIGS. 3–5, the ends 35, 37 of the ducts 31, 33, respectively, are located adjacent each other and spaced from the pivot axis 26. The duct coupling structure 34 is located between the ends 35, 37 of the ducts to insure against the escape of exhaust gas from the juncture of the duct ends as well as to enable the ducts to move relative to each other when the dump body is moved between its aforementioned positions.

The ducts 31, 33 are of rectangular cross sectional shape in the vicinity of their adjacent ends. The duct coupling structure 34 includes a tubular coupling body or member 40 having a generally rectangular cross sectional shape and which defines a rectangular opening 41 through which the duct 31 extends. The coupling body 40 is defined by planar side walls 42, 44 and arcuately curved upper and lower walls 46, 48. Each of the walls 46, 48 has a center of curvature located substantially on the rotation axis 26 of the dump body. The duct 33 may be cylindrical adjacent the engine exhaust remote from the duct 31 depending on the configuration of the engine exhaust section.

The width of the opening 41, i.e., the distance between the side walls 42, 44, is slightly larger than the width of the duct 31. The height of the opening, i.e., the distance between the walls 46, 48, is substantially greater than the height of the duct 31.

In the illustrated embodiment, the coupling body or member 40 is integral with the duct 33. Both the duct 33 and the coupling body 40 are rigidly connected to the dump body 15. As will be apparent from the following, the coupling body 40 could be connected to the duct 31 and frame 11 if desired.

The duct 31 extends freely into the coupling body 40 at an angle with respect to the plane of the opening 41. At this angle (FIG. 2) the rectangular shape of the opening 41 is foreshortened so that it closely surrounds the periphery of the duct 31. The duct 31 carries a peripheral sealing flange 50 which projects from the periphery of the duct. The flange 50 extends continuously around the duct in a plane which is inclined with respect to the longitudinal axis or centerline of the duct. The flange 50 is of substantially the same size and shape as the boundary of the opening 41.

The sealing flange 50 engages a sealing flange 52 carried by the coupling body 40 when the dump body is in the load carrying position (FIGS. 1 and 4). The flange 52 extend about the opening 41 and in the plane of the opening. The sealing flanges 50, 52 are coplanar and are engaged peripherally about the duct 31 and opening 41 when the dump body is in the load carrying position. Engagement of these flanges prevents the escape of exhaust gases from between the coupling body 40 and the duct 31. Preferably the sealing flanges each carry a suitable gasket which defines a planar sealing face. These faces are engaged to assure an adequate seal between the engaged flanges.

When the dump body is moved toward its dumping position, the coupling body 40 orbits about the axis 26 relative to the duct 31 disengaging the sealing flanges 50, 52. When the dump body is in the dumping position (FIGS. 2 and 5) the coupling body 40 has moved sufficiently that the duct 31 again extends into the opening 41 at an angle with respect to the plane of the opening 41. This angle is such that the opening 41 is again foreshortened to closely surround the periphery of the duct 31.

When the coupling body 40 and the duct 31 are positioned as described, a sealing flange 54 carried at the end of the duct 31 engages the sealing flange 52. In the illustrated and preferred embodiment, the sealing flange 54 bounds the end opening of the duct 31. This opening and the flange are inclined with respect to the duct axis. The flange 54 is coplanar with the opening 41 and flange 52 when the body is in its dumping position. The flanges 54, 52 are of essentially the same size and shape. Thus when the body is in its dumping position, these flanges are tightly engaged to seal the juncture of the coupling member and the end of the duct 31.

The sealing flange 54 and the side of the sealing flange 52 which engages the flange 54 are preferably provided with gaskets. The gaskets define planar sealing faces to insure a positive seal between the coupling member and the duct.

The arcuate upper and lower walls 46, 48 of the coupling member assure that the coupling member clears the end of the duct 31 as the coupling member orbits between its sealing positions with respect to the duct.

The duct coupling structure 34 does not seal the juncture between the ducts 31, 33 when the dump body is moving between its load carrying position and its dumping position; however, the curved wall construction of the coupling body guides the exhaust into the duct 33 from the duct 31. Leakage, if any, during this transitional period of operation of the dump body 15 is minimal and remote from the operator's cab 14.

The duct 33 has two duct branches 56, 58. The duct branch 56 extends rearwardly from the coupling 34 and is open to atmosphere at the rear of the dump body. The duct branch 58 extends upwardly from the duct branch 56 and is attached to the structural member 17e with the duct branch 58 opening into the passageway 20. A partition 60 blocks the passageway 20 between the structural member 17d and the duct branch 58 so that exhaust gas in the passageway 20 is required to flow through the structural members 17b–17c as shown by the arrows in FIG. 3.

The volume of exhaust gas flowing into the passageway 20 to heat the dump body 15 is adjustable to control the degree of heating of the dump body. Preferably a vane 62 is supported in the duct 33 between the branches 56, 58. The vane 62 is connected to a position adjusting rod 64 which is rotated to adjust the position of the vane in the duct 33. The rod 64 is rotatably supported by the side walls of the duct 33 and may be manually rotated to adjust the vane position.

As is seen in FIG. 4 if the rod 64 is rotated clockwise, the vane 62 reaches a limit of its travel in which the flow of engine exhaust passing from the system 30 through the duct branch 56 is maximum. When the rod 64 is rotated counterclockwise, the vane moves to a limit position at which the engine exhaust flow through the passageway 20 is maximum, producing maximum heating of the dump body.

A suitable locking device (not shown) may be employed to fix the rod 64 and vane 62 in an adjusted position. This device can consist of a conventional friction clutch, or removable blocking pins, etc.

When the truck is used in a warm climate, the vane can be locked in the position providing minimum heating of the dump body. This minimizes the engine exhaust back pressure so that engine performance is optimized.

The vane is adjustable to a number of positions between its limit positions so that the dump body heating exhaust flow can be controlled according to climatic conditions. This adjustability enables the engine to operate with minimum exhaust back pressure for any given heating requirement of the dump body.

While only a single embodiment of the invention has been illustrated and described in detail, the invention is not to be considered limited to the precise construction shown. It is intended to cover hereby all adaptations, modifications and uses of the disclosed structure which come within the scope of the invention.

What is claimed is:

1. In a vehicle having an engine supported on a frame, a body pivotally movable with respect to said frame about a pivot axis and means for pivoting said body about said axis between first and second positions; an exhaust system for directing exhaust gas from said engine into heat transfer relationship with said body for heating the same comprising:
  a. a first exhaust duct carried by said frame;
  b. a second exhaust duct;
  c. ends of said ducts disposed near each other;
  d. duct coupling structure between said ends of said ducts for directing exhaust in a direction generally transverse to the direction of extent of said pivot axis; and,
  e. said duct coupling structure including:
   1. a coupling member defining an opening;
   2. one of said ducts extending into said coupling member through said opening;
   3. said opening in said member having a larger cross sectional area than the cross sectional area of said one duct;
   4. said means for pivoting said body effecting relative movement between said one duct and said coupling member as said body pivots between said positions; and,
   5. said one duct extending into said opening in said coupling member at first and second angles when said body is in said first and second positions, respectively, with said opening in said coupling member extending closely about said one duct to form a seal.

2. A vehicle as claimed in claim 1 wherein said coupling member is fixed to said body for pivotal movement therewith.

3. A vehicle as claimed in claim 2 wherein said coupling member is spaced from said pivot axis and orbits about said axis when said body moves between said first and second positions.

4. A vehicle as claimed in claim 1 wherein said one duct has a polygonal cross sectional shape and said opening has a polygonal shape similar to the shape of said one duct, said opening having substantially the same dimension as said duct measured parallel to said pivot axis and a larger dimension than said duct measured radially from said pivot axis.

5. A vehicle as claimed in claim 1 and further including first and second sealing flanges connected to said one duct at spaced locations, a third sealing flange connected to said coupling member and disposed about said opening, said third flange engaging said first flange when said body is in one of said positions to seal the juncture of said coupling member and said one duct, said third flange engaging said second flange when said body is in its other position for sealing said juncture.

6. A vehicle as claimed in claim 5 wherein said first and second flanges define planar sealing faces engageable with said third flange, said sealing faces extending about said one duct in a plane which is inclined relative to the longitudinal axis of said one duct.

7. A vehicle as claimed in claim 6 wherein said third flange defines first and second planar sealing faces engageable with the sealing faces on said first and second flanges respectively.

8. A vehicle as claimed in claim 1 and further including an exhaust passageway in said body, said second duct communicating exhaust gas to said passageway, and a movable flow controlling member in said second duct, said movable member controlling the amount exhaust gas flowing to said passageway.

9. A vehicle as claimed in claim 8 wherein said movable member comprises a vane having a first limit position in which the flow of exhaust gas to said passageway is minimum and a second limit position in which the flow of exhaust gas in said passageway is maximum, and structure for positioning said vane between said first and second positions.

10. In a load dumping vehicle:
  a. a frame;
  b. a gas turbine engine supported by said frame;
  c. a dump body connected to said frame by a pivot construction and movable about a pivot axis of said pivot construction between a first load carrying position and a second load dumping position;
  d. a first exhaust duct fixed with respect to said frame and communicating with said engine;
  e. a second exhaust duct fixed to said dump body for directing engine exhaust gas into heat exchange relationship with part of said body;
  f. ends of said ducts opening adjacent each other for enabling exhaust to flow from said first duct to said second duct;
  g. duct coupling structure between said first and second exhaust ducts, said coupling structure comprising:
   1. a tubular coupling member having a first opening into which said first duct extends and a second opening communicating with said second duct, said coupling member directing exhaust gas from said first duct to said second duct in a direction generally transverse to said pivot axis;
   2. means supporting said coupling member for movement with said dump body relative to said first duct orbitally about said pivot axis; and,
   3. at least a part of said coupling member sealingly engaging said first duct when said dump body is in said first position and when said dump body is in said second position.

11. In a vehicle as claimed in claim 10 and further including first and second sealing flanges extending peripherally about said first duct at spaced locations, said flanges having an inner peripheral boundary adjacent said first duct and an outer peripheral boundary and including sealing faces disposed in planes intersecting said pivot axis and inclined with respect to said first duct, said first opening in said coupling member having substantially the same size and shape as said inner peripheral boundaries of said first and second flanges and with one of said sealing faces engaging said coupling member adjacent said opening when said dump body is in said first position and the other sealing face engaging said coupling member adjacent said opening when said dump body is in said second position.

12. A vehicle as claimed in claim 11 wherein the transverse cross sectional shape of said first duct and the shape of said opening in said coupling member are polygonal and have the same number of sides and different areas.

13. In a vehicle as claimed in claim 10 wherein said second duct includes a first branch for directing engine exhaust gas to atmosphere, a second branch for directing engine exhaust gas into heat exchange relationship with at least part of said dump body, and means for controlling the proportion of engine exhaust gas directed through said second branch.

14. In a load dumping vehicle having an engine, a frame, and a dump body pivotally supported on said frame, an exhaust system comprising:
 a. a first exhaust duct supported by said frame;
 b. a second exhaust duct attached to said body and movable therewith as said dump body pivots relative to said frame;
 c. means for coupling said first duct to said second duct for continuously directing engine exhaust through said ducts;
 d. said second duct including a first duct branch for directing exhaust gas into the atmosphere and a second duct branch for directing exhaust gas into heat transfer relationship with portions of said dump body; and,
 e. flow control means for governing the proportion of exhaust gas flowing through said duct branches, said flow control means comprising a vane member supported in said first duct branch downstream from the juncture of said duct branches for movement between adjusted positions to vary the flow of exhaust gas in said first and second branches and a support member connecting said vane member to said first duct branch for adjusting movement in said duct branch.

15. In a wheeled vehicle including a frame, a prime mover of a type which emits exhaust gases at an elevated temperature carried by the frame and a body tiltably mounted on the frame for movement from a load-carrying to a dump position and return, an improved exhaust system comprising:
 a. a first exhaust duct connected to the prime mover and to the frame;
 b. a second exhaust duct connected to the body;
 c. duct coupling structure in telescopic relationship with one of the ducts and connecting the ducts in exhaust transmitting communication;
 d. the telescopic relationship of said coupling structure and the one duct being relatively changeable from a first position when the body is in its load-carrying position to a second position when the body is in its dump position such that the amount of telescopic relationship is greater in one position than the other and the ducts are maintained in exhaust conducting communication by the coupling structure in both positions; and,
 e. duct means connecting a selected duct to exhaust passages within the body for heating the body.

* * * * *